April 14, 1959  A. R. SMITH  2,882,033
METHOD FOR MAKING CEMENT CLINKER
Filed April 18, 1957
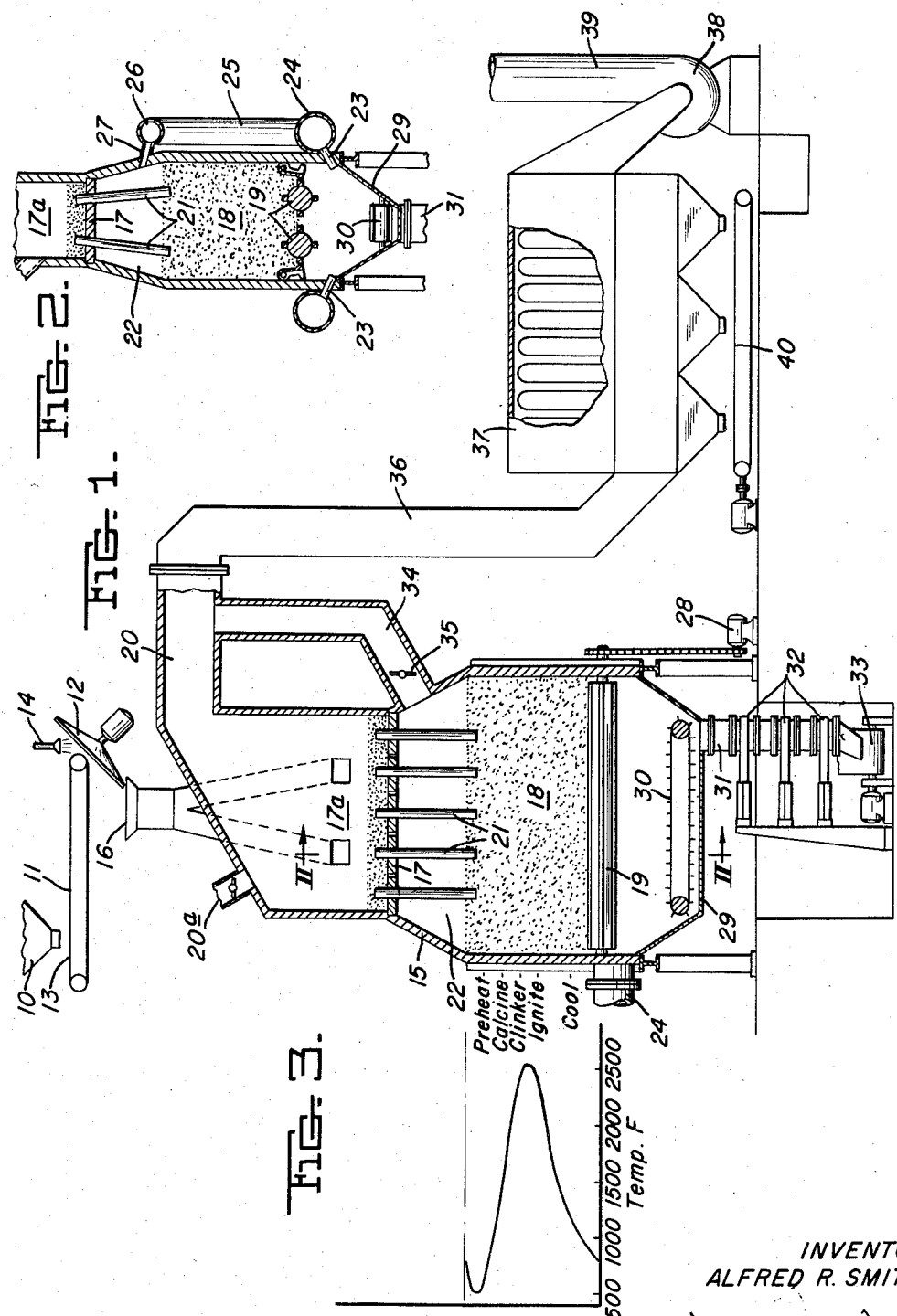
INVENTOR
ALFRED R. SMITH,
By Donald G. Dalton
his Attorney.

United States Patent Office 2,882,033
Patented Apr. 14, 1959

2,882,033

METHOD FOR MAKING CEMENT CLINKER

Alfred R. Smith, Patchogue, N.Y., assignor to United States Steel Corporation, a corporation of New Jersey Application April 18, 1957, Serial No. 653,554

7 Claims. (Cl. 263—53)

This invention relates to the manufacture of cement and, in particular, to a method for burning the raw materials to a clinker convertible by grinding into the finished product.

The object of my invention is to provide a clinker-making method and apparatus lower in cost than the conventional rotary kiln or the substitutes therefor which have been suggested. More particularly, my invention reduces the first cost of the plant as well as the operating cost, especially the fuel cost. In addition, my invention reduces the CO content of the effluent gases and the amount of dust in such gases.

In a preferred embodiment and practice of my invention, I provide a kiln having a reactor chamber for calcining, burning and fusing the raw materials into a clinker. Above the mass of material in the chamber, I maintain a clear space for secondary combustion to permit burning of the CO resulting from reaction of the raw materials. Above the secondary combustion space, I maintain a bed of entering raw materials fluidized by combustion gases from said space, ascending through a perforated grate supporting the bed. Downcomer pipes extend from above said grate to a level below the secondary combustion space, for conducting raw materials from the latter to the reactor chamber proper.

A complete understanding of the invention may be obtained from the following detailed description and explanation which refer to the accompanying drawings illustrating the present preferred embodiment. In the drawings:

Figure 1 is a diagrammatic view largely sectional showing the plant as a whole;

Figure 2 is a transverse section through the kiln taken along the plane of line II—II of Figure 1, certain elements being shown in elevation; and Figure 3 is a temperature curve related to Figure 1, showing the temperature at various elevations in the reactor.

Referring now in detail to the drawings, a mixture of raw materials is accumulated in a hopper 10 and is fed by a conveyor 11 to a pelletizer 12. The raw mix may, for example, be 80% limestone and 20% argillaceous shale. To such mixture, I add about 7% of coal by weight of the mixture. The coal should be preferably of the low-volatile (less than 4%) type. These components are ground before entering hopper 10 to a state in which at least 90% by weight is less than 200-mesh in size. I also introduce into conveyor 11 at 13, the filter cake produced by a leaching and filtering of the dust collected from the effluent gases as described hereinafter.

To the raw materials in pelletizer 12, I add from 10 to 15%, preferably about 12%, of water by weight of the materials, from a supply connection 14. The pelletizer 12 is of such type as to produce agglomerations in a range of sizes, i. e., ½" down to 8-mesh, so that about 95% will be retained on a 6-mesh screen. The pelletized raw material is discharged into the upper or exhaust portion of a kiln 15 through inlet pipes 16, building up a bed about a foot deep on a perforated grate 17 positioned horizontally therein. The space above the grate constitutes a drying and preheating chamber 17a.

Kiln 15 is preferably oblong in horizontal section and includes reactor 18 for calcination and combustion below which are clinker grinders 19. An offtake 20 for effluent gases extends laterally from chamber 17a. The clinker grinders are of known construction, comprising oppositely rotating toothed cylinders and pivoted control gates, one on each side. The reactor 18 is lined with refractory brick laid within a suitable binding of structural members and plate (not shown). Pipes 21 extend downwardly from a level above grate 17, through the latter to a level below the top of chamber 18. Grate 17 has holes about ¼" in diameter spaced along its length and width, on about 6" centers, whereby combustion gases ascending through the grate maintain the pelletized raw material thereon in a fluidized state. I thus recover substantially all the sensible heat of the gases in drying and preheating the incoming cold wet pellets.

Fluidized raw material on grate 17 flows downwardly through pipes 21 into reactor 18, filling it to form a mass resting on clinker grinders 19 and extending upwardly therefrom to about the level of the lower ends of pipes 21. The height of this mass of material may be from 3 to 15 feet, preferably about 8 feet. Thus the pipes 21 maintain a clear space 22 between grate 17 and the material in reactor 18, for secondary combustion of the CO resulting from the reaction of such materials. The mass in reactor 18 is ignited and combustion of the fuel in the raw feed occurs progressively in a layer spaced below the top of the mass.

Air is supplied to reactor 18 through inlets 23 branching from headers 24. A blower (not shown) supplies air to the headers at a pressure equivalent to that of about 80 inches of water. An uptake 25 branching from one of the headers 24 supplies air to a header 26. Inlets 27 connected to header 26 supply secondary air to space 22 to insure combustion of CO therein.

Clinker grinders 19 are driven by a motor 28 at a rate correlated with the rate at which raw material is fed to the reactor 18 so as to maintain the mass of material therein at a substantially constant height. The clinker grinders discharge into a trough 29. A conveyor 30 at the bottom of the trough draws clinker therealong to an outlet pipe 31 controlled by spaced gate valves 32, defining air locks therebetween. By successively opening and closing valves 32, batches of clinker may be discharged onto a carry-away conveyor 33 without releasing the air pressure in reactor 18.

Effluent gases in chamber 22 carry alkali vaporized in reactor 18 from the entering raw materials. This alkali is largely condensed as the gases cool on passing through the bed on grate 17 and returns to reactor 18 to be again vaporized, thus building up the alkali fume concentration of the gases traversing space 22. To maintain the alkali balance of the system, a by-pass or purge pipe 34 controlled by dampers 35, connects space 22 with offtake 20. The diversion of only about 5% of the effluent gases through purge pipe 34 will suffice to prevent the return of excessive alkali to the reactor kiln. A downcomer 36 conducts effluent gases to a dust-collector 37 of the bag-filter type. An air inlet 20a permits the dilution of effluent gases, thereby reducing their temperature from about 425° F. at which they emerge from the bed on grate 17 to about 250° F. which is safe for the fabric of which the filter bags are composed. An induced-draft fan 38 draws gases through the filter bags and discharges them to a stack 39. The bags when shaken periodically discharge accumulated dust to a conveyor 40. This dust is leached with water in a suitable tank to remove soluble alkali and filtered, the filter-cake being returned to conveyor 11 as part of the raw feed. A cooling spray of water may be introduced into offtake 20 if desirable, in lieu of dilution by air, to reduce the temperature of the effluent gases.

It will be evident from the foregoing that, in the normal operation of the apparatus described, air entering at the bottom of the kiln travels upwardly through the descending column of granular material, becoming preheated by contact with the hot clinker formed by burning of fuel and cooling the latter. The solid-material, after being dried and preheated on grate 17, flows downwardly through reactor 18 and is again brought in contact with combustion gases flowing up through the column, then raised in temperature to the calcination point, through the point of ignition of the coal content to clinker and calcine the raw material in the layers above the zone of active combustion, after which it is quickly quenched and then cooled by the upcoming air. The approximate levels of the several zones are indicated by legends at the left in Figure 1. The combustion in reactor 18 produces CO but the latter is largely burned in chamber 22 by the secondary air supplied thereto. The temperature in chamber 22 is maintained at about 1400° F., to insure combustion of the CO in the presence of the air from inlets 27, reducing the CO content of the stack gases.

The pressure of the air supplied through inlets 23 and the suction applied by the exhaust fan 38 are controlled so that the point of zero pressure (where the pressure changes from positive to negative) is just above the bed on grate 17. There is thus no tendency for gases to escape through material inlet pipes 16. The area of grate 17 and the chamber 17a immediately above the bed will be proportioned so as to maintain a space velocity of from 3 to 5 feet per second (standard conditions) through the column, preferably about 4 feet per second, to obtain fluidization for material of the size range and content used.

The thermal losses from the system and the endothermic requirements of calcination remain substantially constant. I am therefore able to control the temperature of the effluent gases in secondary combustion chamber 22 after the combustion of CO, by varying the amount of fuel mixed with cement-making materials. In this manner, I insure that the temperature in chamber 22 will be above that required for ignition of the CO formed in chamber 18, i.e., 1210° F. As an example, the temperature in the chamber is preferably maintained at about 1400° F.

It will be apparent that the invention has numerous advantages. As for economy of plant investment required, a reactor 18, 8′ x 20′ and about 8′ high will suffice for a production of 150–200 bbls. per hour, with correspondingly low maintenance and operating costs. The low height of the column in chamber 18 insures effective quenching of the clinker. Low-grade fuel such as waste coal having a high ash content may be used without difficulty since the ash merely takes the place of some of the cement-making materials. No problem of distributing the pelletized raw materials on grate 17 is encountered since the fluidization thereof causes the pellets to level off and flow almost as a liquid. Disintegration and attrition of the pellets on the grate or before delivery thereto is likewise no problem since I find that the quantity of fines is only about 5% of weight of solids fed to the system. By purging the alkali-bearing gases, the product may be kept below the maximum allowable alkali content of .6% (as the $Na_2O$ equivalent).

The volume of effluent gas per barrel of hourly capacity is less by more than one-half of that produced by a conventional rotary kiln due to high thermal efficiency and low air infiltration. The CO content is much less than the conventional shaft kiln because, although produced in the reactor it is burned in the secondary combustion chamber 22.

Slag-containing mixes, e.g., 67% limestone and 33% slag, may be clinkered by my invention as well as limestone-shale mixes by adding the required amount of a limestone-clay mix to obtain pellets of adequate strength, the ratio of limestone-slag mix to limestone-clay mix being usually about 3 to 1.

Although I have disclosed herein the preferred practice of my invention, I intend to cover as well any change or modification therein which may be made without departing from the spirit and scope of the invention.

I claim:

1. In a method of making cement clinker the steps consisting in establishing a mass of granular clinker-forming material and fuel in a reaction zone, blowing air upwardly through the mass while progressively igniting and burning the fuel component of the mass as it descends, producing effluent gas containing a combustible component, maintaining a clear space above said mass, igniting and burning said component in said space, discharging clinker-forming material onto a bed above said space, conducting the combustion gases from said space through said bed thereby maintaining it in fluidized condition and preheating the material in said bed, and conducting the preheated material from said bed onto the mass in said reaction zone.

2. In a method as defined in claim 1, characterized by purging a portion of the gases from said space thereby preventing the build-up of the alkali concentration in said zone, space and bed.

3. In a method as defined in claim 2, characterized by collecting alkali condensed from said portion of gases and removing the alkali from the remaining dust borne by said gases thereby rendering the dust suitable for re-use.

4. In a method as defined in claim 1, characterized by pelletizing the clinker-forming material and fuel prior to discharge onto said bed.

5. In a method as defined in claim 1, characterized by continuously removing clinker from the bottom of said mass while supporting the main body of the mass in said zone.

6. In a method as defined in claim 1, characterized by introducing secondary air into said space to support combustion of said combustible component therein.

7. In a method as defined in claim 1, characterized by so varying the proportion of the fuel to clinker-forming material as to maintain the temperature in said space above the ignition temperature of said combustible component.

References Cited in the file of this patent

UNITED STATES PATENTS

| | | |
|---|---|---|
| 2,090,868 | Hyde | Aug. 24, 1937 |
| 2,409,707 | Roetheli | Oct. 22, 1946 |
| 2,498,719 | Roetheli | Feb. 28, 1950 |
| 2,650,084 | White | Aug. 25, 1953 |
| 2,668,041 | Knibbs | Feb. 2, 1954 |

FOREIGN PATENTS

| | | |
|---|---|---|
| 70,686 | Austria | Dec. 10, 1915 |
| 520,547 | Belgium | June 30, 1953 |